United States Patent Office.

JOHN R. WILLIAMS, OF TAUNTON, MASSACHUSETTS.

Letters Patent No. 65,321, dated May 28, 1867.

IMPROVED COMPOSITION TO BE USED AS "PUTTY" FOR STONE-WORK.

*The Schedule referred to in these Letters Patent and making part of the same.*

TO ALL WHOM IT MAY CONCERN:

Be it known that I, JOHN R. WILLIAMS, of Taunton, in the county of Bristol, and State of Massachusetts, have invented a new and improved Composition of Matter; and I do hereby declare that the following is a full, clear, and exact description thereof, which will enable others skilled in the art to make and use the same.

The present invention relates to a new and improved composition of matter especially adapted and intended for use as a "putty" for stone-work, which composition or "putty" is made of the following ingredients mixed together in or about the proportions stated, viz: one (1) pound of decomposed slate rock, and five (5) ounces of linseed oil, with or without lime, in the proportion of about one (1) ounce. In the preparation of the composition the several ingredients are mixed together cold, by first slaking the lime dry or with as little water as possible.

Having thus described my invention, I claim as new, and desire to secure by Letters Patent—

The improved composition of matter herein described for the purpose specified.

The above specification of my invention signed by me this 28th day of March, 1867.

JOHN R. WILLIAMS.

Witnesses:
LEML. T. TALBOT,
JOSEPH S. WILLIAMS.